(12) United States Patent
Fan et al.

(10) Patent No.: US 7,078,129 B2
(45) Date of Patent: Jul. 18, 2006

(54) FIRE AND CORROSION RESISTANT THERMALLY STABLE ELECTRODES AND BATTERIES AND METHOD FOR MANUFACTURING SAME

(75) Inventors: Jiang Fan, San Diego, CA (US); David Manis, San Diego, CA (US); Doug Magnuson, San Diego, CA (US); Lu Tse Wan, Hsinchu (TW)

(73) Assignee: Advanced Battery Technology Ltd., Kwai Chung (HK)

( * ) Notice: Subject to any disclaimer, the term of this patent is extended or adjusted under 35 U.S.C. 154(b) by 192 days.

(21) Appl. No.: 10/042,913

(22) Filed: Jan. 11, 2002

(65) Prior Publication Data

US 2003/0134203 A1 Jul. 17, 2003

(51) Int. Cl.
*H01M 4/68* (2006.01)
*H01M 2/08* (2006.01)
*H01M 6/12* (2006.01)

(52) U.S. Cl. .............. 429/245; 429/162; 429/185
(58) Field of Classification Search ............... 429/245, 429/162, 215, 185
See application file for complete search history.

(56) References Cited

U.S. PATENT DOCUMENTS

| | | | |
|---|---|---|---|
| 5,051,325 A * | 9/1991 | Shishikura et al. | ......... 429/341 |
| 5,187,033 A | 2/1993 | Koshiba | |
| 5,262,254 A | 11/1993 | Koksbang et al. | |
| 5,376,478 A | 12/1994 | Nakacho et al. | |
| 5,464,706 A * | 11/1995 | Dasgupta et al. | ......... 429/218.1 |
| 5,498,489 A | 3/1996 | Dasgupta et al. | |
| 5,547,782 A | 8/1996 | Dasgupta et al. | |
| 5,714,277 A | 2/1998 | Kawakami | |
| 5,763,103 A | 6/1998 | McCullough | |
| 5,830,600 A | 11/1998 | Narang | |
| 5,843,592 A | 12/1998 | Barker et al. | |
| 5,961,672 A | 10/1999 | Skotheim et al. | |
| 6,022,641 A * | 2/2000 | Endo et al. | ............... 429/232 |
| 6,040,091 A | 3/2000 | Sugita et al. | |
| 6,168,885 B1 | 1/2001 | Narang et al. | |
| 6,194,098 B1 | 2/2001 | Ying et al. | |

* cited by examiner

*Primary Examiner*—Patrick Joseph Ryan
*Assistant Examiner*—Julian Mercado
(74) *Attorney, Agent, or Firm*—Donn K. Harms

(57) ABSTRACT

An improved battery cell current collectors which are formed as a unitary structure with mating electrodes attached on one surface. The current collectors are formed of non-metallic material including particle-dispersed plastic tape, plastic dispersed carbon tape, fiber dispersed conductive plastic and carbon tape, or particle and metallic powder dispersed conductive tape to resist corrosion. The need to charge the battery immediately after manufacture is eliminated by the improved battery cell design. Additional utility is provided by fire retardant being mixed with one or both of the electrode composite forming the current collectors and the layer forming the current collectors and by the biasing of the current collectors against their terminating contacts by the compressed current collector material communicating a bias of the current collectors against the internal surface of the battery container thereby increasing current flow and decreasing corrosion.

18 Claims, 3 Drawing Sheets

FIRE AND CORROSION RESISTANT THERMALLY STABLE ELECTRODES AND BATTERIES AND METHOD FOR MANUFACTURING SAME

FIELD OF THE INVENTION

The disclosed device relates to electrochemical devices for storing electrical energy. More particularly it relates to the formation of the battery electrodes by adhering the actives forming the electrode directly to the current collectors which are formed of a layer of conductive polymer film or tape.

BACKGROUND OF THE INVENTION

Conventional electrochemical devices such as batteries, are used widely in the world as a source of portable electrical power from direct current. Such battery devices provide the electrical power for everything from watches to automobiles and as a consequence great value is placed on the energy density or electrical storage capacity of these devices and their continued ability to provide an adequate supply of electrical current to the communicating electrical device. Currently the lithium ion battery is a preferred battery configuration due to its inherent ability to store and discharge a large volume of electrical power in relation to its volume and weight.

The conventional construction of lithium ion batteries features a positive and a negative electrode formed of active material on a metal substrate. The electrodes are then encased in a cell can or casing whereupon both electrodes release and absorb lithium ions during discharge and charge of the battery depending on the direction of current flow. During discharge of the battery, the active material in the negative electrode releases lithium ions which are absorbed by the positive electrode and this process is reversed during charging of the battery whereby the positive electrode releases lithium ions to be reabsorbed by the negative electrode.

Continued function of batteries requires that a separator be placed between the positive electrode preventing it from direct contact with the negative electrode. Conventional lithium ion batteries achieve this separation using a separator made from a porous membrane made from a suitable dielectric material to maintain the desired degree of separation of both electrodes and allow passage of the electrolyte therebetween during the ion exchange when used.

An existing problem with the manufacture of conventional lithium ion electrodes arises from metal shards that are produced during the slitting process involved in forming the electrodes to the proper dimensions for encasement. These shards pose a constant danger of damage to the separator and potential shorts between the two electrodes resulting therefrom.

Both electrodes also communicate with a current collector which communicates the electrical current generated during discharge of the electrodes of the battery and permits the electrodes to communicate with an external power source which can be used to recharge the battery. Such current collectors further communicate battery developed electrical current to the external device which uses the battery as source of electrical power. Conventional current collectors are frequently manufactured from stainless steel, iron and nickel alloys, aluminum, copper, and similar materials that provide good electrical communication between the load drawing power external to the battery casing and the electrode housed internally.

As a medium to move the ions between the electrodes an electrolyte is used. A conventional electrolyte in a lithium ion battery contains lithium ions which move between the electrodes during charging and discharging. Such electrolyte provides the means of transport of the lithium ions through the porous separator which separates the two electrodes formed of active material. Typical electrolytes will not function above 150° C.

The constant flow of ions in the proximity of the current collector during discharge and charging of the battery has a high potential to cause corrosion of the current collector itself and the contact points with the electrode thereby degrading the communication of electrical current from the adjacent active material of the electrode. Such corrosion is caused by a number of factors in a lithium ion battery including but not limited to low corrosion resistance of the current collector, high temperatures caused by charging and discharging, the inherent nature of lithium being highly reactive, and other interrelating factors. Conventionally, aluminum and copper are especially susceptible to corrosion from the salts in the electrolytes in a lithium ion battery. Further, there is also a susceptibility to corrosion of current collectors of conventional batteries which can be attributed to inhomogeneous current flow through the current collector itself once it has become corroded and thereby come into uneven contact with the adjacent electrode.

An additional problem with conventionally manufactured lithium ion batteries is the requirement that once manufactured, they must be charged. Typically to prevent corrosion of the copper current collector, batteries must be charged to at least 10% of capacity so that they may be stored and shipped to customers. This is an expensive and time-consuming step in manufacture.

In dealing with lithium ion batteries there is the further vexing problem of combustion of the highly reactive materials forming the electrodes. The material forming the electrodes has a propensity to catch fire if the battery is overcharged or charged at the wrong voltage or overheated by an internal or external short.

As can be discerned, it is imperative that corrosion between the termination collectors adjacent to communicating active material forming the electrodes be kept to a minimum to avoid loss of efficiency of the battery. Such corrosion also risks the total failure of the battery should contact be lost between the termination collector such as the current collector or the battery case, and its communicating electrode. It is further highly desirable to eliminate the potential of shards and debris from the manufacturing process causing short circuits between the electrodes by circumventing the separator. Finally the reduction of the potential of fire during overcharge or short circuits internally or externally is highly desirable.

One solution attempted to prevent such fire hazards from short circuits has been the use of a non flammable electrolyte in the battery. Such a teaching of the use of a flame retardant electrolyte is found in U.S. Pat. No. 6,040,091 (Hiroaki) and U.S. Pat. No. 5,714,277 (Kawakami) as well as other patents. However placement of a flame retardant in the electrolyte as taught by these and other patents inherently complicates the chemistry of the battery since it renders the cell sensitive to voltage and the cell can decompose, as well as limiting the stability of the electrolyte itself.

U.S. Pat. No. 5,547,782 (Dasgupta) attempts to solve the problem of corrosion of the current collector by using an electrically conductive ceramic layer or electrically conductive polymer in a stacked relationship between the electrodes and the metal cover and case forming the battery container. However, Dasgupta also teaches the requirement that the polymer layer must be continuous and non-porous to prevent the severe corrosion caused by contact of the electrodes with the metal surfaces protected. This makes Dasgupta more expensive and not easily manufactured and fails to address the problem of shards and debris contaminating the electrodes and the need to pre-charge the battery before shipment to avoid corrosion.

U.S. Pat. No. 5,187,033 (Koshiba) teaches a lithium secondary battery using a porous film separator and a gold plated stainless steel current collector and uniquely formed electrodes. However Koshiba fails to address the issue of shards piercing the separator and the potential for corrosion with the metal current collector and the metal powder used therein, the fire hazard, and would still generally require a charging of the battery before storage and shipment.

There is a pressing need as such, for a method and components for use in battery construction which will provide for maximum communication of current from the electrode to the adjacent termination component and concurrently provide maximum resistance to the corrosion threatening that communication between the electrode and the termination component. Such a method and components used therein to form the resulting battery, should provide maximum resistance to such corrosion by maximizing the contact of the termination component with the adjacent electrode and should be easy to include in battery construction and be inexpensive. Further, a battery so formed, should minimize or eliminate the hazards of metallic shards causing short circuits and minimize the potential from fire in the battery. Additionally, such a battery should maintain thermal stability at high temperatures and should not be required to be pre-charged before shipment.

SUMMARY OF THE INVENTION

The above problems, and others are overcome by the herein disclosed components and method of construction of an improved Lithium and lithium ion battery. The device features current collectors formed of non-metallic substrates of a polymer or carbon tape layer on which the actives forming the electrode are laminated or coated directly to one or both sides thereof to form a unitary structure featuring the current collector on one layer and the actives on another. Such a construction tends to minimize corrosion while concurrently maximizing conductivity with the electrode and alleviates the requirement of a non-porous layer between the electrodes and the metal case and cover. As corrosion potential is greatly reduced by this construction of the internal components, the need to pre-charge the battery before storage and shipment is eliminated. Additional utility is provided through the optional inclusion of flame retardant additives in the tape layer and/or the electrode actives. An additional benefit afforded is the elimination of the requirement to charge such batteries immediately upon manufacture and before shipment, storage, or sale.

The conducting tape may be a conducting particle-dispersed plastic or a plastic dispersed carbon tape. For the conducting particle-dispersed plastic tape, the plastic is continuous phase and provides the mechanical strength required by the typical continuous coating equipment used to adhere the actives thereon. Dispersed conducting particles in the tape provide a conducting path for electrical current communicated from the active layer formed on the tape. In the case of plastic dispersed carbon tape, the carbon is the continuous phase and provides not only the required strength during manufacture but also the conducting path for the electrical current. Metallic powders such as Aluminum or Copper may be added to either tape matrix to reduce resistance therein. The electrode formed is thermally stable at high temperatures of at least 240 degrees centigrade which is an important feature since the battery will endure the rigors of solder reflow where the battery is soldered to the circuit board by dipping it in molten solder and affixing directly to the board. Additionally, as earlier noted, flame retardants may be added to the tape matrix to thereby inhibit fire in the battery.

Since the collector is a polymer or carbon film, the current collector can be compressed during manufacture without damaging the finished battery and providing an outward biasing from inside the battery case to maintain contact pressure between the current collector and the exterior electrical contact.

Accordingly, it is the object of this invention claimed herein to provide an electrode design and resulting battery that is safer and more corrosion resistant and fire resistant than conventionally available batteries.

It is another object of this invention to improve the intrinsic safety of a battery electrode by reducing the potential for fire in the cell through the use of fire retardant materials allowed by the unique component structure.

It is still another object of this invention to supply non metallic substrate electrode capable of withstanding the mechanical and thermal stresses of high volume production.

It is a still further object of this invention to provide a battery cell current conductor that is non metallic and provides a better connection to the adjacent electrodes.

It is an additional object of this invention to provide a lithium ion battery cell which once manufactured, does not require pre charging before shipment and sale or can be charged to a charge between 0 and 10 percent of capacity and not suffer degradation or corrosion during storage.

A still further object of this invention is the elimination for the need for non-porous layers to be stacked between battery cell walls and the electrodes in lithium ion batteries.

Additionally, it is an object of this invention to remove the need for Copper and Aluminum current collectors and thereby provide for the use of high temperature electrolytes in a lithium ion which would attack the conventional metallic current collectors.

Further objectives of this invention will be brought out in the following part of the specification, wherein detailed description is for the purpose of fully disclosing the invention without placing limitations thereon.

BRIEF DESCRIPTION OF THE DRAWING FIGURES

The accompanying drawings which are incorporated in and form a part of this specification illustrate embodiments of the disclosed processing system and together with the description, serve to explain the principles of the invention.

DETAILED DESCRIPTION OF THE PREFERRED EMBODIMENTS

Figure 1:
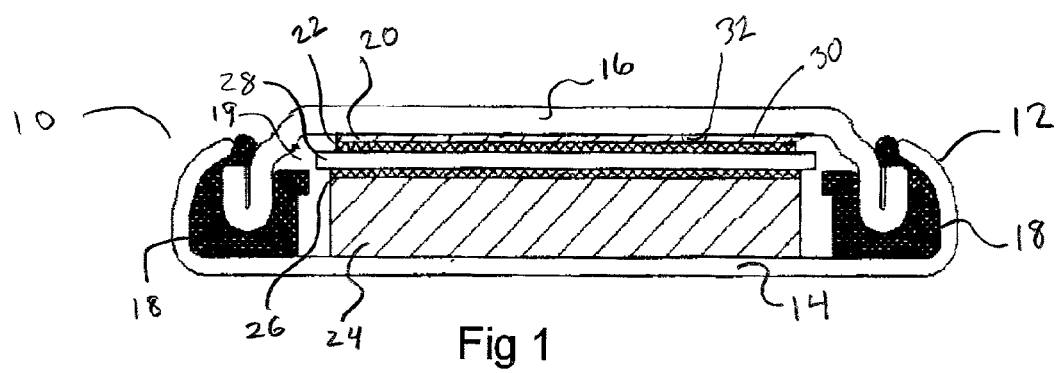
FIG. 1 depicts a side cut away view of a preferred embodiment of the disclosed device featuring a foil current collector coated on one side with active material.

Referring now to FIG. 1 depicting a side cut away view of a preferred embodiment of the disclosed device 10, the device 10 as assembled forms an electrochemical component or battery and features an assembled cell can 12 formed of a cell casing 14 in sealed engagement with cell cap 16. The sealed engagement of the cell casing 14 with a cell cap 16 is provided through the use of a means for sealed engagement of the cell cap 16 to the cell can 12 which in this case is provided by gasket 18 compressed between the wall of the cell casing 14 and the cell cap 16 and concurrently providing an insulating means between both.

Inside the internal cavity defined by the interior dimensions of the cell can 12 is a first current collector 20 adjacent to an attached first electrode 22 thereby forming a unitary structure of current collector 20 and electrode 22. Also, in the interior cavity 19 is a second current collector 24 adjacent to an attached second electrode 26 also forming a unitary structure of second electrode 26 and second current collector 24. Sandwiched between the first electrode 22 and the second electrode 26 is a separator 28.

In this embodiment of the device 10 the first current collector 20 is formed of foil made of one or a combination of copper and aluminum, and has a generally flat upper surface 30 one side which is in contact with the inner surface 32 of the cell cap 16. The shape of the first current collector 20 is generally dimensioned for maximum contact with the inner surface 32 of the cell cap 16 to maximize the transfer of electrical current communicated to the current collector 20 to the cap 16.

The lower surface 34 of the first current collector 20 is adhered directly to the first electrode 22 which is formed of actives which are laminated or otherwise coated directly to the lower surface 34 to thereby form a unitary planar structure featuring the first current collector 20 and first electrode 22 which as depicted in FIG. 1 in the current best mode would be the negative electrode. As depicted the first electrode 22 being the negative electrode would be formed of actives blended and best suited to performing as the negative electrode. Such active materials currently include one or a combination of active materials from a group consisting of carbon, carbon black, graphite and (MCMB). However those skilled in the art will realize that other actives might be used in certain circumstances and such is anticipated.

The separator 28 is formed of an insulating material such as polypropylene that will maintain the desired degree of separation between the first electrode 22 and second electrode 26. The separator 28 is however sufficiently porous to allow the passage of the chosen electrolyte therethrough and between the two electrodes 26 and 28 as required.

Below the separator 28 and adjacent to the cell casing 16 is situated the second current collector 24 which in one preferred mode of the device 10 is best formed of either a conducting particle-dispersed plastic tape or, a plastic dispersed carbon tape having a carbon content of at least 50% by volume. Also preferred would be the use of fiber dispersed conductive plastic and carbon tape, and particle and metallic powder dispersed conductive tape for the second current collector 24. When formed from conducting particle-dispersed plastic tape, the plastic is continuous phase and sufficient in tensile strength to provide the mechanical strength required by the typical continuous coating equipment used to adhere the actives thereon which form the second electrode 26. Currently used plastic materials forming such plastic tape include one or a combination of plastic materials from a group of plastic materials consisting of polystyrene, polyethylene, polypropylene, SBR, or similar plastic materials suited to the purpose.

Dispersed conducting particles bound in the aforementioned plastic forming the tape matrix provide a conducting path for electrical current communicated from the second electrode 26 formed by the active layer adhered to one surface of the second current collector 24. Current preferred conducting particles for inclusion within the particle-dispersed plastic tape include one or a combination of conducting materials from a group of conductive materials consisting of carbon, aluminum, copper, and may be in various forms such as powder, fiber, grains, and other forms suitable to the task.

In the case of plastic dispersed carbon tape, the carbon is the continuous phase and at least 50% by volume and provides not only the required strength during manufacture but also the conducting path for the electrical current. The plastic binder used would be from the aforementioned group of plastic materials. If desired, optionally, metallic powders such as aluminum or copper may be added to either tape matrix to reduce resistance therein.

As noted, two other types of film structures could be used in the formation of the aforementioned plastic tape matrix provide a conducting path for electrical current communicated from the second electrode 26 formed by the active layer adhered to one surface of the second current collector 24. These would be fiber disbursed conductive plastic and carbon tape and particle and metal powder dispersed conductive plastic tape both allowing for the desired mix of conductors from a group of conductors including carbon, aluminum, and copper in different dimensioned particles suspended in the tape matrix.

The second electrode 26 which as depicted would in the current best mode, function as the positive electrode of the battery. It is therefor formed by actives best suited to act as the positive electrode and which are adhered to the planar surface of the second current collector 26 which is to be situated adjacent to the separator 28 when the battery is assembled. Such actives forming the positive or second electrode include one or a combination of actives from a group of actives consisting of Li, Co, O, Ni, Mn, C, S, and Lithium metal. Currently preferred mixtures include, $LiCoO_2$, or $LiNiCoO_2$, or $LiMn_2O_4$. However those skilled in the art will realize that other mixtures or components might be used in certain cases and such is anticipated. The mixture of actives forming the second electrode 26 thereby forms a layered but unitary structure with maximum contact between the second current collector 24 and the adhered second electrode 26. It is then best dimensioned for maximum contact of one planar side with the interior side of the cell casing 14.

Because both the particle-dispersed plastic tape and the plastic dispersed carbon tape are compressable, yet elastic in nature, they both provide an excellent means to bias the first current collector 20 against the cell cap 16 and concurrently bias the second current collector 24 against the cell casing 14 thereby maximizing surface area contact and increasing current flow from the current collectors 20 and 24 and to the cell cap 16 and cell casing 14 respectively. This is true in all embodiments of the device disclosed herein and an important aspect in increasing efficiency thereof by maintaining maximum contact of the current collectors 22 and 24 with the cell cap 16 and cell casing 14 to maximize current flow and minimize any chance of corrosion therebetween. Further true of all embodiments of the device herein disclosed is that they do not require a charge to keep the battery cell from degrading or corroding after manufacture and therefor can be charged to a charge of 0 to 10 percent of the capacity of the battery cell and then be shipped and stored. This is a major improvement in such battery cells which conventionally require a full charge prior to shipment or risk degradation and corrosion.

Additionally, the flame retardants may optionally be added to the tape matrix of both versions of tape used herein to thereby inhibit fire in the device 10. The retardant materials would be best when of a nature which will not dissolve in the chosen battery electrolyte so that the battery cell chemistry and performance will not be sacrificed under normal conditions. Conventionally used flame retardants are limited in use by their solubility in the electrolyte and should be chosen carefully. Currently, the preferred retardants include one or a combination of retardants from a group of flame retardants consisting of, aluminum tri hydrate, magnesium hydroxide, halogen containing flame retardant like decabromodiphenyl tetradecabromodiphenoxy benzene, lithium carbonate, ethylene bistetrabromophthalimide $C_{12}OBr_{10}$, and $C_{18}O_2Br_4$. Additionally preferred additives for fire retardance are chemicals that form Carbon Dioxide at high temperatures such as one or a combination of chemicals from a group consisting of $Li_2CO_3$, $Na_2CO_3$, and $CaCO_3$ However those skilled in the art will recognize that other flame retardants and other chemicals which produce high levels of $CO_2$ or Hbr or $H_2O$ could be used or developed for such use and consequently all such substitutions or modifications are anticipated.

Still further, since the material forming the second current collector of this embodiment the other embodiments herein disclosed is compressable but elastic, it can be compressed during manufacture without damaging the finished battery yet still providing an outward biasing from inside the battery case to maintain contact pressure between the current collector and the exterior electrical contact.

Figure 2:
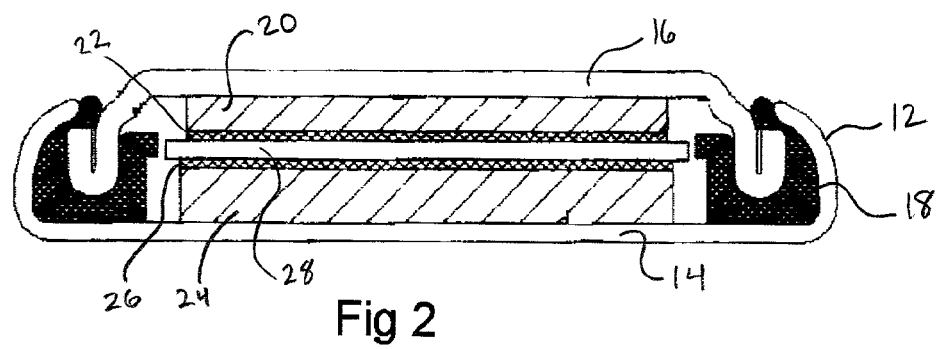
FIG. 2 depicts a side cut away view of an additional preferred embodiment of the device showing both electrodes formed by coating actives directly to the surface of a of non-metallic substrate of polymer having a conductor dispersed therein.

FIG. 2 depicts another preferred embodiment of the device 10 in which the first current collector 20 is formed of either a conducting particle-dispersed plastic tape or, or a plastic dispersed carbon tape in the aforementioned fashion in a unitary construction with the first electrode 22 which is formed and adhered to the side of the first electrode 22 adjacent to the separator 28.

Figure 4:
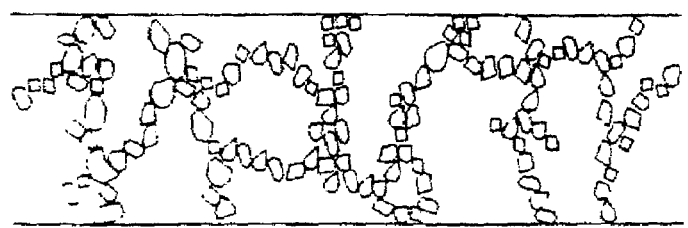
FIG. 4 depicts a section of particle dispersed conductive plastic.
Figure 5:
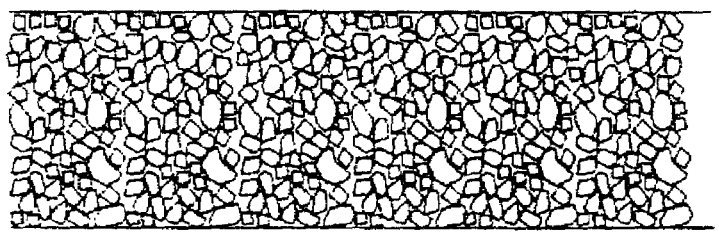
FIG. 5 shows a section view of plastic dispersed carbon tape.
Figure 6:
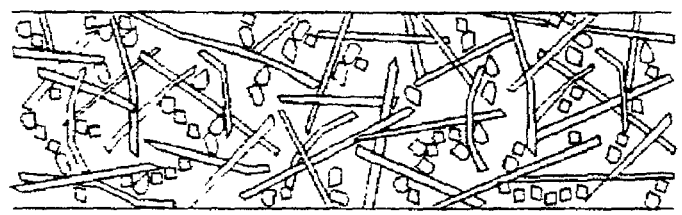
FIG. 6 shows a section view of fiber dispersed conductive plastic and carbon tape.
Figure 7:
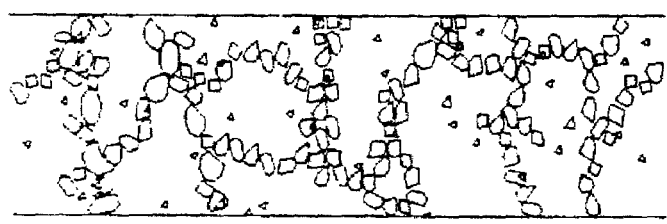
FIG. 7 depicts a section view of a particle and metallic powder dispersed conductive plastic.

In this embodiment the second current collector 24 is also formed of either a conducting particle-dispersed conductive plastic tape as represented in FIG. 4, or, a plastic dispersed carbon tape shown in FIG. 5 in the aforementioned fashion as a unitary structure with the second electrode 26 which is adhered to the side surface of the second current collector 24 adjacent to 25 the separator 28. This embodiment provides all of the benefits of the aforementioned means to bias the first current collector 20 against the cell cap 16 and concurrently bias the second current collector 24 against the cell casing 14 which is provided by the compressable yet elastic nature of both types of tape and can be made fire retardant also by the addition of the aforementioned fire retardant to either tape matrix or to the electrode actives.

Figure 3:
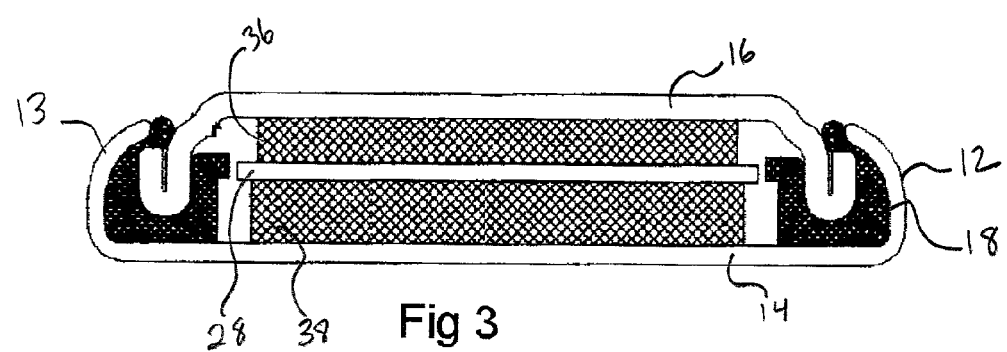
FIG. 3 depicts another preferred embodiment of the disclosed device featuring the actives of the battery mixed directly into the non-metallic polymer substrate also having a conductor dispersed therein.

Another preferred embodiment as depicted in FIG. 3 depicts an upper electrode 36 and lower electrode 38 distanced by the separator 28. In this embodiment the upper electrode 36 is formed as a unitary structure with the aforementioned actives disbursed in combination with the aforementioned conductives in a solid solution rather than a layered unitary structure. The compression rolling process of making the film with these components creates a low porous electrode. The addition of a good electrolyte absorber such as PVDF provides good ionic conduction and prevents dissolving of the PVDF at high temperatures. A non polar binder such as PE can be used to provide a binding function and add thermal stability. In the current best mode, the co-polymer PVDF-HFP at 0–15% is used with 5–8% preferred.

With the actives interlaced in the tape with the conductives, current is communicated directly by the upper electrode 36 to the cell cap 16 and by the lower electrode 38 to the cell casing 14. The aforementioned elasticity of the material making up both tapes provide a means to bias the upper electrode 34 against the cell cap 16 and concurrently bias the lower electrode 38 against the surface of the cell casing 14 thus maximizing current flow due to the tight contact therebetween and minimizing any corrosion. As with the aforementioned embodiments, flame retardant material may also be added to the mixture making up the solid solution forming the upper electrode 36 and lower electrode 38 to impart flame retardant characteristics to the assembled device 10.

Figure 3A:
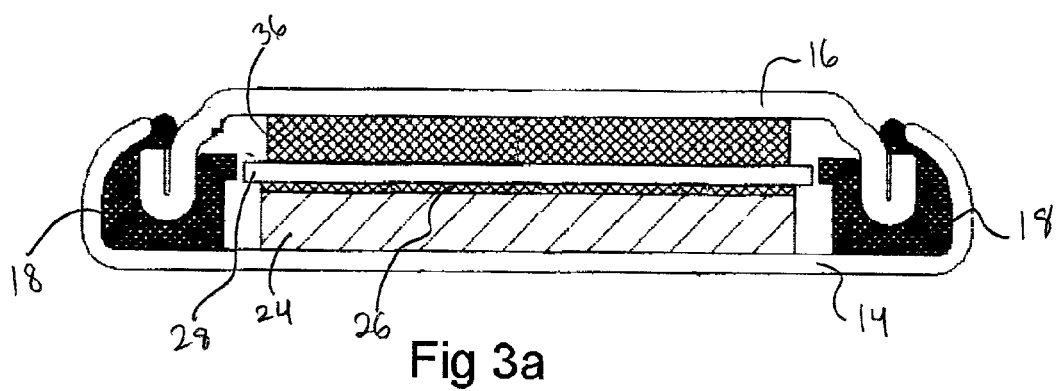
FIG. 3a depicts another preferred embodiment featuring the actives of one electrode mixed directly into the polymer substrate and those of the second electrode coated to the surface of the non-metallic substrate.

FIG. 3a depicts another preferred embodiment featuring the actives of one electrode mixed directly into the polymer substrate as described above in FIG. 3 and those of the second electrode coated to the surface of the non-metallic substrate also as described in detail above as in FIG. 2.

Figure 8:
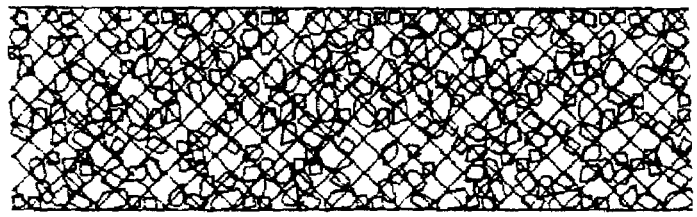
FIG. 8 depicts a view of carbon tape and electrode actives mixed together.

FIG. 8 depicts a view of carbon disbursed plastic tape and aforementioned electrode actives mixed together to form an electrode as a unitary structure.

Figure 9:
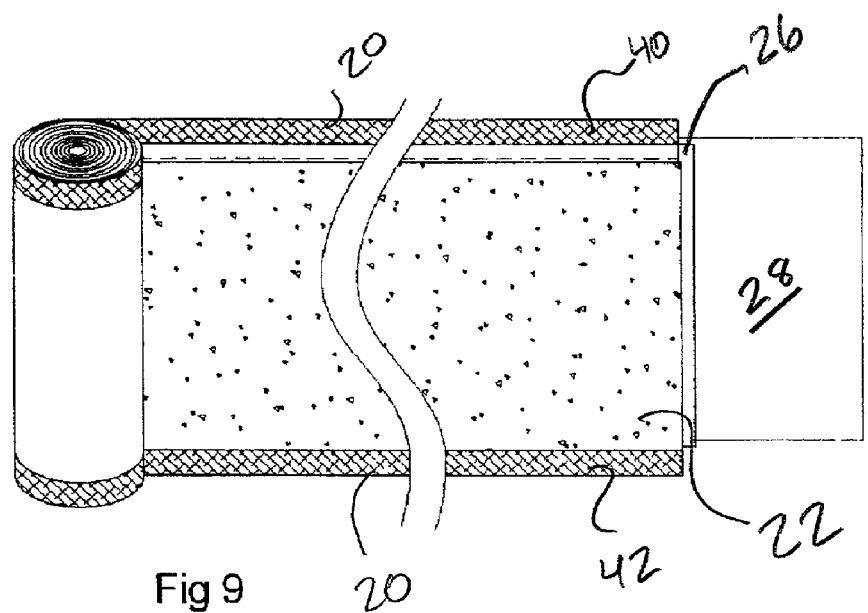
FIG. 9 depicts a cylindrical embodiment of the disclosed device.

FIG. 9 depicts a cylindrical embodiment of the disclosed device 10 wherein the electrodes would both be formed on elongated planar film structure in the same fashions and using any of the same combinations described above in FIGS. 1 through 3a, only in an elongated fashion for rolling, while leaving one edge 40 and 42 of each of the first electrode and second electrode respectively uncoated along an entire edge, if the actives are coated as above, to provide a current collector edge for communication of current from the elongated electrodes formed in the above referenced fashion to and from the electrodes. Any of the above referenced film and electrode combinations could be used depending on the end use of the device and would provide the benefit of fire retardance and obviating the need to charge the battery before sale or storage.

Figure 10:
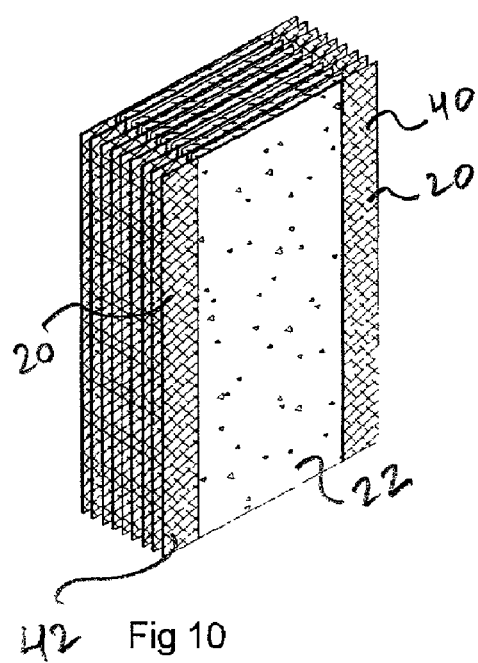
FIG. 10 depicts a prismatic embodiment of the disclosed device featuring a plurality of individual planar stacked electrodes.

FIG. 10 depicts a prismatic embodiment the device featuring stacked electrodes and separators which would be placed inside a rectangular case and with one edge 40 and 42 of each formed electrode uncoated to function as a current collector and to communicate electrical current to and from the electrodes. Any of the above referenced film and electrode combinations could be used depending on the end use of the device and would provide the benefit of fire retardance and obviating the need to charge the battery before sale or storage.

It should be understood that while the best embodiments of the device herein disclosed employ all of the group of individual improvements herein described and disclosed, greatly improved performance and utility may be also achieved, using one or more of the individual improvements herein disclosed. Further, while the present device and method have been described herein, with reference to particular embodiments and components thereof, a latitude of modifications, various changes and substitutions are intended in the foregoing disclosure, and it will be apparent that in some instances some features of the device can and will be employed to improve conventional battery design and performance without a corresponding use of other features without departing from the scope of the device and method herein set forth. Consequently, all such modifications and variations are included within the scope of the invention as defined by the following claims.

The invention claimed is:

1. An improved battery cell comprising:
    a cell can having a cell casing in sealed communication with a cell cap and having an interior cavity;
    means for insulation of said cell casing from direct contact with said cell cap;
    a first current collector in said interior cavity having a first planar surface and a second planar surface;
    said first planar surface in contact with said cell cap;
    a first electrode adhered to said second planar surface, said first electrode and said first current collector thereby forming a unitary structure;
    a porous second current collector in said interior cavity having an upper planar surface and a lower planar surface;
    said lower planar surface in contact with said cell casing;
    a second electrode adhered to said upper planar surface, said second current collector and said second electrode thereby forming a second unitary structure;
    said first current collector and said second current collector, both formed from one or a combination of materials from a group of materials consisting of particle-dispersed plastic tape, plastic dispersed carbon tape, fiber dispersed conductive plastic and carbon tape, particle and metallic powder dispersed conductive plastic;
    at least one of said first current collector and said second current collector being rendered fire retardant by addition of collector fire retardant material thereto; and
    a separator in contact with said upper planar surface and said second planar surface.

2. The improved battery cell as defined in claim 1 wherein said collector fire retardant material is comprised of one or a combination of a group of collector fire retardant materials consisting of aluminum trihydrate, magnesium hydroxide, decabromodiphenyl tetradecabromodiphenoxy benzene, lithium carbonate, ethylene bistetrabromophthalimide, $C_{12}OBr_{10}$, and $C_{18}O_2Br_4$.

3. The improved battery cell as defined in claim 1 wherein said collector fire retardant material is comprised of one or a combination of a group of collector fire retardant materials consisting of $Li_2CO_3$, $Na_2CO_3$, and $CaCO_3$.

4. The improved battery cell as defined in claim 1 additionally comprising said first electrode and said second electrode being rendered fire retardant by addition of active fire retardant material to the active material forming one or both of said first and said second electrode.

5. The improved battery cell as defined in claim 4 wherein said active fire retardant material is comprised of one or a combination of active fire retardant materials from a group of active fire retardant materials consisting of aluminum trihydrate, magnesium hydroxide, decabromodiphenyl tetradecabromodiphenoxy benzene, lithium carbonate, ethylene bistetrabromophthalimide, $Li_2CO_3$, $Na_2CO_3$, and $CaCO_3$.

6. The improved battery cell as defined in claim 4 additionally comprising at least one of said first electrode and said second electrode being rendered fire retardant by addition of active fire retardant material to said active material added to said materials forming said first and said second current collectors.

7. The improved battery cell as defined in claim 6 wherein said active fire retardant material is comprised of one or a combination of active fire retardant materials from a group of active fire retardant materials consisting of aluminum trihydrate, magnesium hydroxide, decabromodiphenyl tetradecabromodiphenoxy benzene, lithium carbonate, ethylene bistetrabromophthalimide, $Li_2CO_3$, $Na_2CO_3$, and $CaCO_3$.

8. The improved battery cell as defined in claim 6 additionally comprising:
    means to bias the first current collector against the cell cap and concurrently bias the second current collector against the cell casing.

9. The improved battery cell as defined in claim 8 wherein said means to bias the first current collector against cell cap and concurrently bias said second current collector against said cell casing is provided by said material forming said first current collector and said material forming said second current collector being compressed when said cell casing is in said sealed communication with said cell cap and thereafter being in biased communication with said first current collector and said second current collector.

10. The improved battery cell as defined in claim 1 additionally comprising said first electrode and said second electrode being rendered fire retardant by addition of active fire retardant material to the active material forming one or both said first and said second electrode.

11. The improved battery cell as defined in claim 10 wherein said active fire retardant material is comprised of one or a combination of active fire retardant materials from a group of active fire retardant materials consisting of aluminum trihydrate, magnesium hydroxide, decabromodiphenyl tetradecabromodiphenoxy benzene, lithium carbonate, ethylene bistetrabromophthalimide, $Li_2CO_3$, $Na_2CO_3$, and $CaCO_3$.

12. The improved battery cell as defined in claim 10 further comprising:
    said battery cell charged upon manufacture to a maximum charge between 0 to 10% of the capacity of said battery cell whereby said battery cell may be shipped or stored without suffering corrosion or degradation.

13. The improved battery cell as defined in claim 1 additional comprising:

means to bias the first current collector against the cell cap and concurrently bias the second current collector against the cell casing.

14. The improved battery cell as defined in claim 13 wherein said means to bias the first current collector against cell cap and concurrently bias said second current collector against said cell casing is provided by said material forming said first current collector and said material forming said second current collector being compressed when said cell casing is in said sealed communication with said cell cap and thereafter being in biased communication with said first current collector and said second current collector.

15. The improved battery cell as defined in claim 1 wherein said first electrode and said second electrode are formed of one or a combination of active materials from a group of active materials consisting of Li, Co, O, Ni, Mn, C, S, and Lithium metal.

16. The improved battery cell as defined in claim 1 further comprising:
   said battery cell charged upon manufacture to a maximum charge between 0 to 10% of the capacity of said battery cell whereby said battery cell may be shipped or stored without suffering corrosion or degradation.

17. The improved battery cell as defined in claim 1 wherein said cell is cylindrical in shape.

18. The improved battery cell as defined in claim 1 wherein said cell is prismatic having a plurality of positive and negative electrodes formed therein.

* * * * *